(12) United States Patent
Burton et al.

(10) Patent No.: US 7,258,797 B2
(45) Date of Patent: Aug. 21, 2007

(54) FILTER FOR REMOVING WATER AND/OR SURFACTANTS FROM A LIPOPHILIC FLUID

(75) Inventors: Dewey Edward Burton, Fairfield, OH (US); Arseni Valerevich Radomyselski, Hamilton, OH (US); Paul Amaat Raymond Gerald France, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 39 days.

(21) Appl. No.: 10/238,009

(22) Filed: Sep. 9, 2002

(65) Prior Publication Data

US 2003/0047511 A1 Mar. 13, 2003

Related U.S. Application Data

(60) Provisional application No. 60/318,440, filed on Sep. 10, 2001.

(51) Int. Cl.
*B01D 15/00* (2006.01)

(52) U.S. Cl. .......... 210/689; 210/287; 210/290; 210/502.1; 210/505; 210/508; 210/690; 210/691

(58) Field of Classification Search ........... 210/689, 210/435, 493.5, 502.1, 503, 505, 507, 508, 210/690, 691, 266, 284, 287, 290; 510/407
See application file for complete search history.

(56) References Cited

U.S. PATENT DOCUMENTS

| | | | |
|---|---|---|---|
| 3,395,086 A | | 7/1968 | Victor et al. |
| 3,692,467 A | | 9/1972 | Durr et al. |
| 3,733,267 A | * | 5/1973 | Haase ............ 210/669 |
| 3,839,176 A | | 10/1974 | McCoy et al. |
| 3,935,099 A | | 1/1976 | Weaver et al. |
| 3,997,484 A | | 12/1976 | Weaver et al. |
| 4,108,599 A | | 8/1978 | Coll-Palagos et al. |
| 4,138,337 A | * | 2/1979 | Smith ............ 210/238 |
| 4,584,092 A | * | 4/1986 | Kanematu et al. ...... 208/188 |
| 4,604,205 A | | 8/1986 | Ayers ............ 210/508 |
| 4,618,388 A | * | 10/1986 | Ayers ............ 156/284 |
| 4,664,754 A | | 5/1987 | Caputi et al. |
| 4,787,949 A | * | 11/1988 | Cole et al. ............ 156/222 |
| 5,057,240 A | * | 10/1991 | Madore et al. ...... 252/174.15 |
| 5,882,506 A | | 3/1999 | Ohsol et al. |
| 6,059,845 A | | 5/2000 | Berndt et al. |
| 6,063,135 A | * | 5/2000 | Berndt et al. ............ 8/142 |
| 6,086,635 A | | 7/2000 | Berndt et al. |
| 6,310,029 B1 | * | 10/2001 | Kilgour et al. ............ 510/466 |
| 6,312,476 B1 | | 11/2001 | Perry et al. |
| 6,313,079 B1 | * | 11/2001 | Murphy ............ 510/285 |
| 6,368,359 B1 | * | 4/2002 | Perry et al. ............ 8/142 |
| 2001/0004062 A1 | * | 6/2001 | Rutledge et al. ............ 210/315 |

(Continued)

FOREIGN PATENT DOCUMENTS

DE     3739711     6/1989

(Continued)

*Primary Examiner*—Duane Smith
(74) *Attorney, Agent, or Firm*—Kim William Zerby; Steven W. Miller

(57) ABSTRACT

The present invention relates to processes for removing water and/or surfactants from lipophilic fluids, absorbent materials employed in such processes, and lipophilic fluids produced by such processes.

13 Claims, 1 Drawing Sheet

U.S. PATENT DOCUMENTS

| | | | |
|---|---|---|---|
| 2002/0017493 A1* | 2/2002 | Ehrnsperger et al. | 210/660 |
| 2002/0038480 A1 | 4/2002 | Deak et al. | |
| 2002/0184715 A1 | 12/2002 | Taylor et al. | |
| 2003/0060396 A1* | 3/2003 | Deak et al. | 510/511 |

FOREIGN PATENT DOCUMENTS

| | | |
|---|---|---|
| EP | 0 669 152 A1 | 8/1995 |
| EP | 0841 362 | 5/1998 |
| JP | 61-085995 | 5/1986 |
| WO | WO 01/06051 A1 | 1/2001 |
| WO | WO 01/27380 A1 | 4/2001 |
| WO | WO 01/34613 A1 | 5/2001 |
| WO | WO 01/44256 A1 | 6/2001 |
| WO | WO 01/93977 A2 | 12/2001 |
| WO | WO 01/94679 A2 | 12/2001 |
| WO | WO 02/077356 A1 | 10/2002 |

* cited by examiner

FILTER FOR REMOVING WATER AND/OR SURFACTANTS FROM A LIPOPHILIC FLUID

RELATED APPLICATIONS

This application claims priority to U.S. Provisional Application Ser. No. 60/318,440 filed on Sep. 10, 2001.

FIELD OF THE INVENTION

The present invention relates to processes for removing water and/or surfactants from lipophilic fluids, absorbent materials employed in such processes, and lipophilic fluids produced by such processes.

BACKGROUND OF THE INVENTION

Lipophilic fluids, such as dry cleaning solvents, may comprise water and/or surfactants and often times do comprise water and/or surfactants especially after fabric articles have been treated in dry cleaning processes.

The presence of water and/or surfactants in a post-fabric article treatment lipophilic fluid is undesirable for various reasons, especially if re-use of the lipophilic fluid is desired. One reason is that soils and/or other contaminants removed from the fabric article during the lipophilic fluid treatment process could become commingled and/or associated with water and/or the surfactants, thus creating a potential redeposition problem of the soils and/or contaminants onto the fabric article or new fabric articles if the lipophilic fluid is reused prior to removing any water and/or surfactants.

Accordingly, there is a need for a process for removing and/or reducing water and surfactants from a lipophilic fluid.

SUMMARY OF THE INVENTION

The present invention fulfills the needs described above by providing processes for removing water and/or surfactants from lipophilic fluids, absorbent materials employed in such processes, and lipophilic fluids produced by such processes.

During fabric treating processes utilizing lipophilic fluids, the lipophilic fluids typically end up containing surfactants, water and/or other "non-lipophilic fluid materials". How the surfactants, water and/or other "non-lipophilic fluid materials" end up in the lipophilic fluid is not the focus of the present invention, rather the present invention focuses on removing and/or reducing water and/or the surfactants from the lipophilic fluids such that the lipophilic fluids are pure or substantially pure. In other words, such that the pure and/or substantially pure lipophilic fluids preferably comprise a level of water and the surfactants that does not impair the performance of the pure and/or substantially pure lipophilic fluid in subsequent steps of and/or new fabric treating processes. Preferably, the level of water and/or the surfactants present in the pure or substantially pure lipophilic fluid is less than about 1%, and/or from about 0% to about 1% and/or from about 0% to about 0.5% and/or from about 0% to about 0.3% and/or from about 0.00001% to about 0.1% and/or from about 0.0001% to about 0.01% by weight of the lipophilic fluid. In one embodiment, the level of water and/or surfactants present in a pure or substantially pure lipophilic fluid is less than 5 ppm.

The present invention provides methods and systems for safely separating water and/or surfactants from a lipophilic fluid, preferably in a cost effective, efficient, and safe manner.

In a first embodiment, the present invention provides a process for removing water and/or surfactants from an emulsion of a lipophilic fluid and water and/or surfactant, said process comprising the step of exposing said emulsion to an absorbent matrix comprising an absorbent material in order to effect the removal of said water and/or said surfactants from said emulsion of a lipophilic fluid and water and/or surfactant. The lipophilic fluid is recovered from the absorbent matrix as pure or substantially pure lipophilic fluid.

In a second embodiment, the present invention provides a system for removing water and/or surfactants from an emulsion of a lipophilic fluid and water and/or surfactant, said system comprising exposing said emulsion to an absorbent matrix comprising an absorbent material in order to effect the removal of said water and/or surfactants from said emulsion of a lipophilic fluid and water and/or surfactant. The lipophilic fluid is recovered from the absorbent matrix as a pure or substantially pure lipophilic fluid.

In a third embodiment, the present invention provides a composition comprising an absorbent material, lipophilic fluid, water and an emulsifier. The emulsifier may be a surfactant.

In a fourth embodiment, the present invention provides a composition comprising an absorbent material, lipophilic fluid and a surfactant.

In a fifth embodiment, the present invention provides a composition comprising an absorbent material, lipophilic fluid, water and a surfactant.

In yet another embodiment, the present invention provides a filter comprising the absorbent material of the present invention.

These and other aspects, features and advantages will become apparent to those of ordinary skill in the art from the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are, in relevant part, incorporated herein by reference.

DETAILED DESCRIPTION

Definitions

Figure 1:
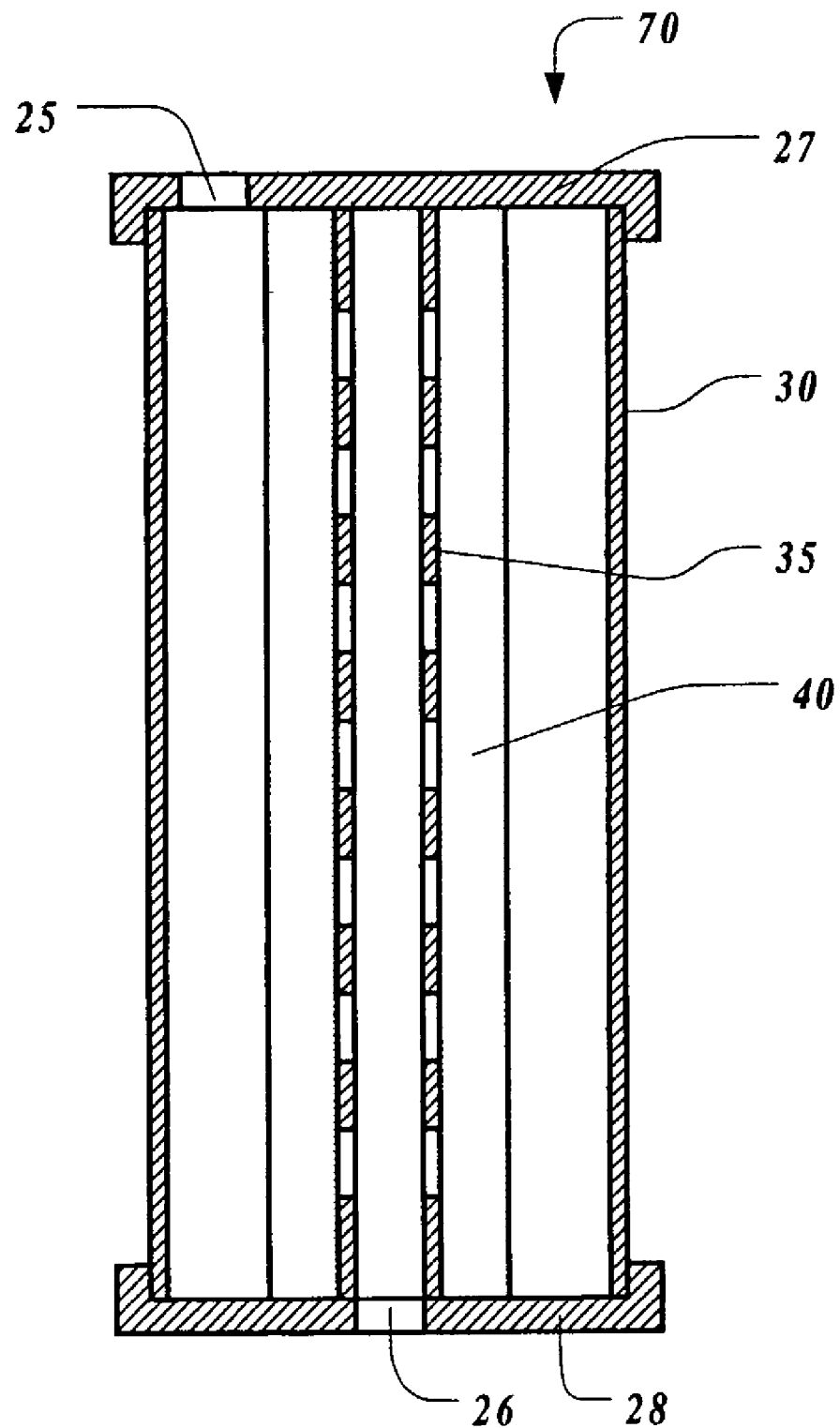
FIG. 1 is a schematic representation of an absorbent material for use with the processes of the present invention.

The term "fabric article" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "absorbent material" or "absorbent polymer" used herein is intended to mean any material capable of selectively absorbing or adsorbing water and/or water-containing liquids without absorbing lipophilic fluids as described in detail. In other words, absorbent materials or absorbent polymers comprise a water absorbing agent. In the art they may also be referred to as "responsive gels," "gel," and "polymeric gel." For a list of phase changing gels, see the textbook *Responsive Gels, Volume Transitions II*, Ed K. Dusek, Springer Verlag Berlin, 1993 (herein incorporated by reference). See also, *Thermo-responsive Gels*, Radiat. Phys. Chem., Volume 46, No. 2, pp. 185-190, Elsevier Science Ltd. Great Britain, 1995 (herein incorporated by reference). Super absorbent polymers, also suitable for use with the present invention, are polymeric materials that have an absorption capacity at or above 5 grams/gram. See also, *Superabsorbent Polymers Science and Technology*, edited by Fredric L. Buchholz and Nicholas A. Peppas, American Chemical Society, Washington D.C., 1994 (particularly Chapter 9 by Tadao Shimomura and Takashi Namba entitled "Preparation and Application of High-Performance Superabsorbent Polymers) herein incorporated by reference.

The water absorbing agent of the present invention may have a water absorbing capacity of at least about 50 g water/g of water absorbing agent and/or from about 50 g water/g of water absorbing agent to about 300 g water/g water absorbing agent and/or from about 100 g of water/g of water absorbing agent to about 200 g of water/g of water absorbing agent. The water absorbing capacity of the water absorbing agent is determined in a water environment, not a lipophilic fluid environment.

The water absorbing agent may have an average particle size of at least about 5 micons and/or from about 5 microns to about 500 microns and/or from about 50 microns to about 350 microns.

The absorbent material of the present invention may comprise two or more water absorbing agents 1) each separate and discrete from each other or 2) commingled with one another.

The term "absorbent matrix permeability aid" or "spacer material" or "spacer" used herein is intended to mean any fibrous or particulate material that is, at most, only slightly soluble in water and/or lipophilic fluid.

The term "absorbent matrix" used herein is intended to mean a matrix in any form that is capable of absorbing and/or adsorbing water. At minimum, it comprises an absorbent material. It may optionally comprise a spacer material and/or a high surface area material.

The term "lipophilic fluid" used herein is intended to mean any nonaqueous fluid capable of removing sebum, as described in more detail herein below.

The term "cleaning composition" and/or "treating composition" used herein is intended to mean any lipophilic fluid-containing composition that comes into direct contact with fabric articles to be cleaned. It should be understood that the term encompasses uses other than cleaning, such as conditioning and sizing. Furthermore, optional cleaning adjuncts such as additional surfactants other than those surfactants described above, bleaches, and the like may be added to the "cleaning composition". That is, cleaning adjuncts may be optionally combined with the lipophilic fluid. These optional cleaning adjuncts are described in more detail herein below. Such cleaning adjuncts may be present in the cleaning compositions of the present invention at a level of from 0.01% to about 10% by weight of the cleaning composition.

The term "soil" means any undesirable substance on a fabric article that is desired to be removed. By the terms "water-based" or "hydrophilic" soils, it is meant that the soil comprised water at the time it first came in contact with the fabric article, or the soil retains a significant portion of water on the fabric article. Examples of water-based soils include, but are not limited to beverages, many food soils, water soluble dyes, bodily fluids such as sweat, urine or blood, outdoor soils such as grass stains and mud.

The term "capable of suspending water in a lipophilic fluid" means that a material is able to suspend, solvate or emulsify water, which is immiscible with the lipophilic fluid, in a way that the water remains visibly suspended, solvated or emulsified when left undisturbed for a period of at least five minutes after initial mixing of the components. In some examples of compositions in accordance with the present invention, the compositions may be colloidal in nature and/or appear milky. In other examples of compositions in accordance with the present invention, the compositions may be transparent.

The term "insoluble in a lipophilic fluid" means that when added to a lipophilic fluid, a material physically separates from the lipophilic fluid (i.e. settle-out, flocculate, float) within 5 minutes after addition, whereas a material that is "soluble in a lipophilic fluid" does not physically separate from the lipophilic fluid within 5 minutes after addition.

The term "consumable detergent composition" means any composition, that when combined with a lipophilic fluid, results in a cleaning composition according to the present invention.

The term "processing aid" refers to any material that renders the consumable detergent composition more suitable for formulation, stability, and/or dilution with a lipophilic fluid to form a cleaning composition in accordance with the present invention.

The term "mixing" as used herein means combining two or more materials (i.e., fluids, more specifically a lipophilic fluid and a consumable detergent composition) in such a way that a homogeneous mixture is formed. Suitable mixing processes are known in the art. Nonlimiting examples of suitable mixing processes include vortex mixing processes and static mixing processes.

Filter

The filter of the present invention comprises an absorbent material in accordance with the present invention. The filter may have a housing within which the absorbent material is housed. The housing may have an inlet through which the emulsion of lipophilic fluid and water and/or surfactant flow through to contact the absorbent material.

Lipophilic Fluid

The lipophilic fluid herein is one having a liquid phase present under operating conditions of a fabric article treating appliance, in other words, during treatment of a fabric article in accordance with the present invention. In general such a lipophilic fluid can be fully liquid at ambient temperature and pressure, can be an easily melted solid, e.g., one which becomes liquid at temperatures in the range from about 0 deg. C to about 60 deg. C, or can comprise a mixture of liquid and vapor phases at ambient temperatures and pressures, e.g., at 25 deg. C and 1 atm. pressure. Thus, the lipophilic fluid is not a compressible gas such as carbon dioxide.

It is preferred that the lipophilic fluids herein be nonflammable or have relatively high flash points and/or low VOC (volatile organic compound) characteristics, these terms having their conventional meanings as used in the dry cleaning industry, to equal or, preferably, exceed the characteristics of known conventional dry cleaning fluids.

Moreover, suitable lipophilic fluids herein are readily flowable and nonviscous.

In general, lipophilic fluids herein are required to be fluids capable of at least partially dissolving sebum or body soil as defined in the test hereinafter. Mixtures of lipophilic fluid are also suitable, and provided that the requirements of the Lipophilic Fluid Test, as described below, are met, the lipophilic fluid can include any fraction of dry-cleaning solvents, especially newer types including fluorinated solvents, or perfluorinated amines. Some perfluorinated amines such as perfluorotributylamines while unsuitable for use as lipophilic fluid may be present as one of many possible adjuncts present in the lipophilic fluid-containing composition.

Other suitable lipophilic fluids include, but are not limited to, diol solvent systems e.g., higher diols such as C6- or C8- or higher diols, organosilicone solvents including both cyclic and acyclic types, and the like, and mixtures thereof.

A preferred group of nonaqueous lipophilic fluids suitable for incorporation as a major component of the compositions of the present invention include low-volatility nonfluorinated organics, silicones, especially those other than amino functional silicones, and mixtures thereof. Low volatility nonfluorinated organics include for example OLEAN® and other polyol esters, or certain relatively nonvolatile biodegradable mid-chain branched petroleum fractions.

Another preferred group of nonaqueous lipophilic fluids suitable for incorporation as a major component of the compositions of the present invention include, but are not limited to, glycol ethers, for example propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether. Suitable silicones for use as a major component, e.g., more than 50%, of the composition include cyclopentasiloxanes, sometimes termed "D5", and/or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable lipophilic fluids are commercially available from Procter & Gamble or from Dow Chemical and other suppliers.

Qualification of Lipophilic Fluid and Lipophilic Fluid Test (LF Test)

Any nonaqueous fluid that is both capable of meeting known requirements for a dry-cleaning fluid (e.g, flash point etc.) and is capable of at least partially dissolving sebum, as indicated by the test method described below, is suitable as a lipophilic fluid herein. As a general guideline, perfluorobutylamine (Fluorinert FC-43®) on its own (with or without adjuncts) is a reference material which by definition is unsuitable as a lipophilic fluid for use herein (it is essentially a nonsolvent) while cyclopentasiloxanes have suitable sebum-dissolving properties and dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials, each vial will contain one type of lipophilic soil. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a clear single phase is formed in any of the vials containing lipophilic soils, then the nonaqueous fluid qualifies as suitable for use as a "lipophilic fluid" in accordance with the present invention. However, if two or more separate layers are formed in all three vials, then the amount of nonaqueous fluid dissolved in the oil phase will need to be further determined before rejecting or accepting the nonaqueous fluid as qualified.

In such a case, with a syringe, carefully extract a 200-microliter sample from each layer in each vial. The syringe-extracted layer samples are placed in GC auto sampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass). A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat#1221131. The GC is suitably operated under the following conditions:

Carrier Gas: Hydrogen
Column Head Pressure: 9 psi
Flows: Column Flow @~1.5 ml/min.
Split Vent @~250-500 ml/min.
Septum Purge @1 ml/min.
Injection: HP 7673 Autosampler, 10 ul syringe, 1 ul injection
Injector Temperature: 350° C.
Detector Temperature: 380° C.
Oven Temperature Program: initial 60° C. hold 1 min.
rate 25° C./min.
final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage and/or fabric puckering profile and do not appreciably damage plastic buttons. Certain materials which in sebum removal qualify for use as lipophilic fluids, for example ethyl lactate, can be quite objectionable in their tendency to dissolve buttons, and if such a material is to be used in the compositions of the present invention, it will be formulated with water and/or other solvents such that the overall mix is not substantially damaging to buttons. Other lipophilic fluids, D5, for example, meet the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135, which are incorporated herein by reference.

Lipophilic fluids can include linear and cyclic polysiloxanes, hydrocarbons and chlorinated hydrocarbons, with the exception of PERC and DF2000 which are explicitly not covered by the lipophilic fluid definition as used herein. More preferred are the linear and cyclic polysiloxanes and hydrocarbons of the glycol ether, acetate ester, lactate ester families. Preferred lipophilic fluids include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

The level of lipophilic fluid, when present in the fabric article treating compositions according to the present invention, is preferably from about 70% to about 99.99%, more preferably from about 90% to about 99.9%, and even more preferably from about 95% to about 99.8% by weight of the fabric article treating composition.

The level of lipophilic fluid, when present in the consumable detergent compositions according to the present invention, is preferably from about 0.1% to about 90%, more preferably from about 0.5% to about 75%, and even more preferably from about 1% to about 50% by weight of the consumable detergent composition.

Lipophilic Fluid Adjuncts

During fabric treating processes utilizing lipophilic fluids, the lipophilic fluids typically end up containing surfactant components and/or surfactants, water and/or other "non-lipophilic fluid materials".

Surfactant Component

Surfactant components and/or conventional surfactants may become mixed with the lipophilic fluid as a result of a fabric treating process utilizing both materials or may be added to a lipophilic fluid prior to using the lipophilic fluid for a fabric treating process. How the surfactant component and/or conventional surfactant comes to be present in the lipophilic fluid is not particularly important for the present invention. This present invention addresses the problem of removing the surfactant component and/or conventional surfactants from the lipophilic fluid.

Surfactant components (i.e., materials that have properties similar to surfactants) and conventional surfactants that may be present in the surfactant-containing lipophilic fluid of the present invention.

A wide range of conventional surfactants can be used as treating agents in the treating compositions of the present invention.

Nonlimiting examples of these other surfactants include conventional anionic, nonionic, cationic and zwitterionic surfactants.

Surfactants included in the treating compositions afforded by the present invention comprise at least 0.01%, preferably at least about 0.1%, more preferably at least about 0.5%, even more preferably at least about 1%, most preferably at least about 3% to about 80%, more preferably to about 60%, most preferably to about 50% by weight of composition depending upon the particular surfactants used and the desired effects to be achieved.

The surfactant can be nonionic, anionic, amphoteric, amphophilic, zwitterionic, cationic, semi-polar nonionic, and mixtures thereof, nonlimiting examples of which are disclosed in U.S. Pat. Nos. 5,707,950 and 5,576,282. A typical listing of anionic, nonionic, amphoteric and zwitterionic classes, and species of these surfactants, is given in U.S. Pat. No. 3,664,961 issued to Norris on May 23, 1972. Preferred compositions comprise nonionic surfactants and/or mixtures of nonionic surfactants with other surfactants, especially anionic surfactants.

Nonlimiting examples of surfactants useful herein include the conventional $C_8$-$C_{18}$ alkyl ethoxylates ("AE"), with EO about 1-22, including the so-called narrow peaked alkyl ethoxylates and $C_6$-$C_{12}$ alkyl phenol alkoxylates (especially ethoxylates and mixed ethoxy/propoxy), alkyl dialkyl amine oxide, alkanoyl glucose amide, $C_{11}$-$C_{18}$ alkyl benzene sulfonates and primary, secondary and random alkyl sulfates, the $C_{10}$-$C_{18}$ alkyl alkoxy sulfates, the $C_{10}$-$C_{18}$ alkyl polyglycosides and their corresponding sulfated polyglycosides, $C_{12}$-$C_{18}$ alpha-sulfonated fatty acid esters, $C_{12}$-$C_{18}$ alkyl and alkyl phenol alkoxylates (especially ethoxylates and mixed ethoxy/propoxy), $C_{12}$-$C_{18}$ betaines, schercotaines and sulfobetaines ("sultaines"), $C_{10}$-$C_{18}$ amine oxides, and the like. Other conventional useful surfactants are listed in standard texts.

The surfactant components and/or surfactants may include the following nonlimiting examples:
    a) Anionic surfactants (e.g., alkyl or aryl sulfates, aerosol derivatives, etc)
    b) Cationic or basic surfactants (e.g., quaternary surfactants, primary and secondary amines, etc.)
    c) Non-ionic surfactants (e.g., Brij surfactants, Neodol surfactants, etc.)

The surfactant component of the present invention is a material that is capable of suspending water in a lipophilic fluid and enhancing soil removal benefits of a lipophilic fluid. As a condition of their performance, said materials are soluble in the lipophilic fluid.

One class of materials can include siloxane-based surfactants (siloxane-based materials). The siloxane-based surfactants in this application may be siloxane polymers for other applications. The siloxane-based surfactants typically have a weight average molecular weight from 500 to 20,000. Such materials, derived from poly(dimethylsiloxane), are well known in the art. In the present invention, not all such siloxane-based surfactants are suitable, because they do not provide improved cleaning of soils compared to the level of cleaning provided by the lipophilic fluid itself.

Suitable siloxane-based surfactants comprise a polyether siloxane having the formula:

$$M_a D_b D'_c D''_d M'_{2-a}$$

wherein a is 0-2; b is 0-1000; c is 0-50; d is 0-50, provided that a+c+d is at least 1;

M is $R^1{}_{3-e}X_e SiO_{1/2}$ wherein $R^1$ is independently H, or a monovalent hydrocarbon group, X is hydroxyl group, and e is 0 or 1;

M' is $R^2{}_3 SiO_{1/2}$ wherein $R^2$ is independently H, a monovalent hydrocarbon group, or $(CH_2)_f$—$(C6H4)_g$O—$(C_2H_4O)_h$—$(C_3H_6O)_i$—$(C_kH_{2k}O)_j$—$R^3$, provided that at least one $R^2$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1-10, g is 0 or 1, h is 1-50, i is 0-50, j is 0-50, k is 4-8;

D is $R^4{}_2 SiO_{2/2}$ wherein $R^4$ is independently H or a monovalent hydrocarbon group;

D' is $R^5{}_2 SiO_{2/2}$ wherein $R^5$ is independently $R^2$ provided that at least one $R^5$ is $(CH_2)_f$—$(C6H4)_g$ O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1-10, g is 0 or 1, h is 1-50, i is 0-50, j is 0-50, k is 4-8; and D" is $R^6{}_2 SiO_{2/2}$ wherein $R^6$ is independently H, a monovalent hydrocarbon group or $(CH_2)_l (C_6H_4)_m (A)_n$-$[(L)_o$-$(A')_p$-$]_q$-$(L')_r Z(G)_s$, wherein l is 1-10; m is 0 or 1; n is 0-5; o is 0-3; p is 0 or 1; q is 0-10; r is 0-3; s is 0-3; $C_6H_4$ is unsubstituted or substituted with a $C_{1-10}$ alkyl or alkenyl; A and A' are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$alkyl or alkenyl, a carbohydrate unsubstituted or substituted with a $C_{1-10}$alkyl or alkenyl or an ammonium; G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

Examples of the types of siloxane-based surfactants described herein above may be found in EP-1,043,443A1, EP-1,041,189 and WO-01/34,706 (all to GE Silicones) and U.S. Pat. No. 5,676,705, U.S. Pat. No. 5,683,977, U.S. Pat. No. 5,683,473, and EP-1,092,803A1 (all to Lever Brothers).

Nonlimiting commercially available examples of suitable siloxane-based surfactants are TSF 4446 (ex. General Electric Silicones), XS69-B5476 (ex. General Electric Silicones); Jenamine HSX (ex. DelCon) and Y12147 (ex. OSi Specialties).

A second preferred class of materials suitable for the surfactant component is organic in nature. Preferred materials are organosulfosuccinate surfactants, with carbon chains of from about 6 to about 20 carbon atoms. Most preferred are organosulfosuccinates containing dialkly chains, each with carbon chains of from about 6 to about 20 carbon atoms. Also preferred are chains containing aryl or alkyl aryl, substituted or unsubstituted, branched or linear, saturated or unsaturated groups.

Nonlimiting commercially available examples of suitable organosulfosuccinate surfactants are available under the trade names of Aerosol OT and Aerosol TR-70 (ex. Cytec).

In one embodiment, the treating agent is insoluble in water. In another embodiment, the treating agent is insoluble in water, but soluble in a lipophilic fluid. In yet another embodiment, the treating agent is insoluble in water, soluble in a lipophilic fluid and has an HLB of from about 1 to about 9 or from about 1 to about 7 or from about 1 to about 5.

In still another embodiment, the treating agent is insoluble in water and insoluble in a lipophilic fluid. In still yet another embodiment, the treating agent in conjunction with a solubilizing agent is at least partially soluble in a lipophilic fluid and/or water. In the solubilizing agent embodiment, the treating agent is present at a level in the treating composition at from about 0.001% to about 5% or from about 0.001% to about 3% or from about 0.001% to about 1% by weight of the treating composition.

Nonlimiting examples of suitable treating agents include treating agents commercially available from Dow Corning under tradenames such as DC1248, SF1528 DC5225C and DCQ4 3667; and Silwets from Witco under tradenames such as L8620, L7210, L7220.

The surfactant component, when present in the surfactant-containing lipophilic fluid can be present at any level, typically the surfactant component is present at a level of from about 0.01% to about 10%, more preferably from about 0.02% to about 5%, even more preferably from about 0.05% to about 2% by weight of the cleaning composition.

Another surfactant component/surfactant that may be present in the surfactant-containing lipophilic fluid is characterized as non-silicone additives. The non-silicone additives preferably comprise a strongly polar and/or hydrogen-bonding head group. Examples of the strongly polar and/or hydrogen-bonding head group are alcohols, carboxylic acids, sulfates, sulphonates, phosphates, phosphonates, and nitrogen containing materials. Preferred non-silicone additives are nitrogen containing materials selected from the group consisting of primary, secondary and tertiary amines, diamines, triamines, ethoxylated amines, amine oxides, amides, betaines, quaternary ammonium salts, and mixtures thereof. Alkylamines are particularly preferred. Additionally, branching on the alkyl chain to help lower the melting point is highly preferred. Even more preferred are primary alkylamines comprising from about 6 to about 22 carbon atoms.

Particularly preferred primary alkylamines are oleylamine (commercially available from Akzo under the trade name Armeen OLD), dodecylamine (commercially available from Akzo under the trade name Armeen 12D), branched $C_{16}$-$C_{22}$ alkylamine (commercially available from Rohm & Haas under the trade name Primene JM-T) and mixtures thereof.

The non-silicone additives, when present in the treating compositions of the present invention, preferably comprises from about 0.01% to about 10%, more preferably from about 0.02% to about 5%, even more preferably from about 0.05% to about 2% by weight of the treating composition.

Polar Solvent

The contaminant-containing lipophilic fluid of the present invention may comprise a polar solvent. Non-limiting examples of polar solvents include: water, alcohols, glycols, polyglycols, ethers, carbonates, dibasic esters, ketones, other oxygenated solvents, and mixtures thereof. Further examples of alcohols include: C1-C126 alcohols, such as propanol, ethanol, isopropyl alcohol, etc. . . . , benzyl alcohol, and diols such as 1,2-hexanediol. The Dowanol series by Dow Chemical are examples of glycols and polyglycols useful in the present invention, such as Dowanol TPM, TPnP, DPnB, DPnP, TPnB, PPh, DPM, DPMA, DB, and others. Further examples include propylene glycol, butylene glycol, polybutylene glycol and more hydrophobic glycols. Examples of carbonate solvents are ethylene, propylene and butylene carbonantes such as those available under the Jeffsol tradename. Polar solvents for the present invention can be further identified through their dispersive ($\square_D$), polar ($\square_P$) and hydrogen bonding ($\square_H$) Hansen solubility parameters. Preferred polar solvents or polar solvent mixtures have fractional polar ($f_P$) and fractional hydrogen bonding ($f_H$) values of $f_P>0.02$ and $f_H>0.10$, where $f_P=\square_P/(\square_D+\square_P+\square_H)$ and $f_H=\square_H/(\square_D+\square_P+\square_H)$, more preferably $f_P>0.05$ and $f_H>0.20$, and most preferably $f_P>0.07$ and $f_H>0.30$.

Polar solvent may be present in the contaminant-containing lipophilic fluid at any level, typically it is present in the contaminant-containing lipophilic fluid at a level of from about 0.001% to about 10%, more preferably from about 0.005% to about 5%, even more preferably from about 0.01% to about 1% by weight of the contaminant-containing lipophilic fluid.

In one embodiment, the contaminant-containing lipophilic fluid comprises from about 0% to about 5% or from about 0% to about 3% or from about 0.0001% to about 1% by weight of the contaminant-containing lipophilic fluid of a polar solvent.

In the treating composition of the present invention, the levels of polar solvent can be from about 0 to about 70%, preferably 1 to 50%, even more preferably 1 to 30% by weight of the detergent composition.

In another embodiment, the surfactant-containing lipophilic fluid comprises a surfactant selected from the group consisting of anionic surfactants, cationic surfactants, nonionic surfactants, zwitterionic surfactants and mixtures thereof.

Absorbent Materials

The absorbent materials of the present invention comprise one or more water absorbing agents. Suitable water absorbing agents and/or absorbent materials comprising water absorbing agents of the present invention are described herein below.

Hydrogel-Forming Absorbent Polymers

The absorbent polymers of the present invention preferably comprise at least one hydrogel-forming absorbent polymer (also referred to as hydrogel-forming polymer). Hydrogel-forming polymers useful in the present invention include a variety of water-insoluble, but water-swellable polymers capable of absorbing aqueous liquids. Such hydrogel-forming polymers are well known in the art and any of these polymers are useful in the present invention.

Hydrogel-forming absorbent polymers are also commonly referred to as "hydrocolloids," or "absorbent" materials and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methaerylates, and the respective quaternary salts thereof. Typically, hydrogel-forming absorbent polymers useful in the present invention have a multiplicity of anionic or cationic functional groups such as sulfonic acid or amide or amino groups, and more typically carboxy, groups. Examples of polymers suitable for use herein include those that are prepared from polymerizable, unsaturated, acid-containing monomers. Examples of cationic polymers with cationic groups are prepared from base-containing monomers. Thus, such monomers include the olefinically unsaturated acids and anhydrides that contain at least one carbon-to-carbon olefinic double bond. More specifically, these monomers can be selected from olefinically unsaturated carboxylic acids and acid anhydrides, olefinically unsaturated sulfonic acids, and mixtures thereof. As indicated above, the nature of the hydrogel-forming absorbent polymer is not critical to the present invention; nonetheless, the selection of the optimal polymeric material may enhance the performance characteristics of the present invention. The disclosure that follows describes preferred properties of the absorbent polymers useful herein. These properties should not be interpreted as limitations; rather, they merely indicate the progression that has occurred in the absorbent polymer art over the past several years.

Some non-acid monomers can also be included, usually in minor amounts, in preparing the hydrogel-forming absorbent polymers herein. Such non-acid monomers can include, for example, the water-soluble or water-dispersible esters of the acid-containing monomers, as well as monomers that contain no carboxylic or sulfonic acid groups at all. Optional non-acid monomers can thus include monomers containing the following types of functional groups: carboxylic acid or sulfonic acid esters, hydroxyl groups, amide-groups, amino groups, nitrile groups, quaternary ammonium salt groups, aryl groups (e.g., phenyl groups, such as those derived from styrene monomer). These non-acid monomers are well-known materials and are described in greater detail, for example, in U.S. Pat. No. 4,076,663 (Masuda et al.), issued Feb. 28, 1978, and in U.S. Pat. No. 4,062,817 (Westerman), issued Dec. 13, 1977, both of which are incorporated by reference.

Olefinically unsaturated carboxylic acid and carboxylic acid anhydride monomers include the acrylic acids typified by acrylic acid itself, methacrylic acid, ethacrylic acid, α-chloroacrylic acid, a-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-sterylacrylic acid, itaconic acid, citroconic acid, mesaconic acid, glutaconic acid, aconitic acid, maleic acid, fumaric acid, tricarboxyethylene and maleic acid anhydride.

Olefinically unsaturated sulfonic acid monomers include aliphatic or aromatic vinyl sulfonic acids such as vinylsulfonic acid, allyl sulfonic acid, vinyl toluene sulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid.

Preferred hydrogel-forming absorbent polymers for use in the present invention contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid. These polymers can be used either solely or in the form of a mixture of two or more different polymers. Examples of these polymer materials are disclosed in U.S.

Pat. No. 3,661,875, U.S. Pat. No. 4,076,663, U.S. Pat. No. 4,093,776, U.S. Pat. No. 4,666,983, and U.S. Pat. No. 4,734,478.

Most preferred polymer materials for use in making the hydrogel-forming absorbent polymers are slightly network crosslinked polymers of partially neutralized polyacrylic acids and starch derivatives thereof. Most preferably, the hydrogel-forming absorbent polymers comprise from about 50 to about 95%, preferably about 75%, neutralized, slightly network crosslinked, polyacrylic acid (i.e., poly (sodium acrylate/acrylic acid)). Network crosslinking renders the polymer substantially water-insoluble and, in part, determines the absorptive capacity and extractable polymer content characteristics of the hydrogel-forming absorbent polymers. Processes for network crosslinking these polymers and typical network crosslinking agents are described in greater detail in U.S. Pat. No. 4,076,663.

While the hydrogel-forming absorbent polymer is preferably of one type (i.e., homogeneous), mixtures of polymers can also be used in the present invention. For example, mixtures of starch-acrylic acid graft copolymers and slightly network crosslinked polymers of partially neutralized polyacrylic acid can be used in the present invention.

The hydrogel-forming polymer component may also be in the form of a mixed-bed ion-exchange composition comprising a cation-exchange hydrogel-forming absorbent polymer and an anion-exchange hydrogel-forming absorbent polymer. Such mixed-bed ion-exchange compositions are described in, e.g., U.S. patent application Ser. No. 09/130,321, filed Jan. 7, 1998 by Ashraf, et al. (P&G Case 6976R—titled "ABSORBENT POLYMER COMPOSITIONS WITH HIGH SORPTION CAPACITY AND HIGH FLUID PERMEABILITY UNDER AN APPLIED PRESSURE"); and U.S. Pat. No. 6,121,509; the disclosure of each of which is incorporated herein by reference.

The hydrogel-forming absorbent polymers useful in the present invention can have a size, shape and/or morphology varying over a wide range. These polymers can be in the form of particles that do not have a large ratio of greatest dimension to smallest dimension (e.g., granules, pulverulents, interparticle aggregates, interparticle crosslinked aggregates, and the like) and can be in the form of fibers, sheets, films, foams, flakes and the like. The hydrogel-forming absorbent polymers can also comprise mixtures with low levels of one or more additives, such as for example powdered silica, zeolites, activated carbon, molecular sieves, surfactants, glue, binders, and the like. The components in this mixture can be physically and/or chemically associated in a form such that the hydrogel-forming polymer component and the non-hydrogel-forming polymer additive are not readily physically separable.

The hydrogel-forming absorbent polymers can be essentially non-porous (i.e., no internal porosity) or have substantial internal porosity.

For particles as described above, particle size is defined as the dimension determined by sieve size analysis. Thus, for example, a particle that is retained on a U.S.A. Standard Testing Sieve with 710 micron openings (e.g., No. 25 U.S. Series Alternate Sieve Designation) is considered to have a size greater than 710 microns; a particle that passes through a sieve with 710 micron openings and is retained on a sieve with 500 micron openings (e.g., No. 35 U.S. Series Alternate Sieve Designation) is considered to have a particle size between 500 and 710 μm; and a particle that passes through a sieve with 500 micron openings is considered to have a size less than 500 μm. The mass median particle size of a given sample of hydrogel-forming absorbent polymer particles is defined as the particle size that divides the sample in half on a mass basis, i.e., one-half of the sample by weight will have a particle size less than the mass median size and one-half of the sample will have a particle size greater than the mass median size. A standard particle-size plotting method (wherein the cumulative weight percent of the particle sample retained on or passed through a given sieve size opening is plotted versus sieve size opening on probability paper) is typically used to determine mass median particle size when the 50% mass value does not correspond to the size opening of a U.S.A. Standard Testing Sieve. These methods for determining particle sizes of the hydrogel-forming absorbent polymer particles are further described in U.S. Pat. No. 5,061,259 (Goldman et al.), issued Oct. 29, 1991, which is incorporated by reference.

For particles of hydrogel-forming absorbent polymers useful in the present invention, the particles will generally range in size from about 1 to about 2000 μm, more preferably from about 20 to about 1000 μm. The mass median particle size will generally be from about 20 to about 1500 μm, more preferably from about 50 μm to about 1000 μm, and even more preferably from about 100 to about 800 μm. For embodiments containing films, membranes, foam, fibers, or polymers coated on a substrate like a nonwoven, particles larger than the ones described above may be useful or even preferred.

In specific embodiments, other properties of the absorbent polymer may also be relevant. In such embodiments, the materials may have one or more of the properties described by U.S. Pat. No. 5,562,646, issued Oct. 8, 1996 to Goldman et al. and U.S. Pat. No. 5,599,335, issued Feb. 4, 1997 to Goldman et al., the disclosure of each of which is incorporated by reference herein.

The basic hydrogel-forming absorbent polymer can be formed in any conventional manner. Typical and preferred processes for producing these polymers are described in U.S. Reissue Pat. No. 32,649 (Brandt et al.), issued Apr. 19, 1988, U.S. Pat. No. 4,666,983 (Tsubakimoto et al.), issued May 19, 1987, and U.S. Pat. No. 4,625,001 (Tsubakimoto et al.), issued Nov. 25, 1986, all of which are incorporated by reference.

Preferred methods for forming the basic hydrogel-forming absorbent polymer are those involving aqueous solution or other solution polymerization methods. As described in the above-referenced U.S. Pat. No. Reissue 32,649, aqueous solution polymerization involves the use of an aqueous reaction mixture to carry out polymerization. The aqueous reaction mixture is then subjected to polymerization conditions that are sufficient to produce in the mixture, substantially water-insoluble, slightly network crosslinked polymer. The mass of polymer formed can then be pulverized or chopped to form individual particles.

More specifically, the aqueous solution polymerization method for producing the hydrogel-forming absorbent polymer comprises the preparation of an aqueous reaction mixture in which to carry out the polymerization. One element of such a reaction mixture is the acid group-containing monomer that will form the "backbone" of the hydrogel-forming absorbent polymer to be produced. The reaction mixture will generally comprise about 100 parts by weight of the monomer. Another component of the aqueous reaction mixture comprises a network crosslinking agent. Network crosslinking agents useful in forming the hydrogel-forming absorbent polymer according to the present invention are described in more detail in the above-referenced U.S. Reissue Pat. No. 32,649, U.S. Pat. No. 4,666,983, and U.S. Pat. No. 4,625,001. The network crosslinking agent will generally be present in the aqueous reaction mixture in an amount of from about 0.001 mole percent to about 5 mole percent based on the total moles of monomer present in the aqueous mixture (about 0.01 to about 20 parts by weight, based on 100 parts by weight of the monomer). An optional component of the aqueous reaction mixture comprises a free radical initiator including, for example, peroxygen compounds such as sodium, potassium, and ammonium persulfates, caprylyl peroxide, benzoyl peroxide, hydrogen peroxide, cumene hydroperoxides, tertiary butyl diperphthalate, tertiary butyl perbenzoate, sodium peracetate, sodium percarbonate, and the like. Other optional components of the aqueous reaction mixture comprise the various non-acidic co-monomers, including esters of the essential unsaturated acidic functional group-containing monomers or other co-monomers containing no carboxylic or sulfonic acid functionalities.

The aqueous reaction mixture is subjected to polymerization conditions that are sufficient to produce in the mixture substantially water-insoluble, but water-swellable, hydrogel-forming absorbent slightly network crosslinked polymers. The polymerization conditions are also discussed in more detail in the three above-referenced patents. Such polymerization conditions generally involve heating (thermal activation techniques) to a polymerization temperature from about 0° to about 100° C., more preferably from about 5° to about 40° C. Polymerization conditions under which the aqueous reaction mixture is maintained can also include, for example, subjecting the reaction mixture, or portions thereof, to any conventional form of polymerization activating irradiation. Radioactive, electronic, ultraviolet, and electromagnetic radiation are alternative conventional polymerization techniques.

The acid functional groups of the hydrogel-forming absorbent polymer formed in the aqueous reaction mixture are also preferably neutralized. Neutralization can be carried out in any conventional manner that results in at least about 25 mole percent, and more preferably at least about 50 mole percent, of the total monomer utilized to form the polymer being acid group-containing monomers that are neutralized with a salt-forming cation. Such salt-forming cations include, for example, alkali metals, ammonium, substituted ammonium and amines as discussed in further detail in the above-references U.S. Reissue Pat. No. 32,649.

While it is preferred that the particulate versions of hydrogel-forming absorbent polymer be manufactured using an aqueous solution polymerization process, it is also possible to carry out the polymerization process using multi-phase polymerization processing techniques such as inverse emulsion polymerization or inverse suspension polymerization procedures. In the inverse emulsion polymerization or inverse suspension polymerization procedures, the aqueous reaction mixture as described before is suspended in the form of tiny droplets in a matrix of a water-immiscible, inert organic solvent such as cyclohexane. The resultant particles of hydrogel-forming absorbent polymer are generally spherical in shape. Inverse suspension polymerization procedures are described in greater detail in U.S. Pat. No. 4,340,706 (Obaysashi et al.), issued Jul. 20, 1982, U.S. Pat. No. 4,506,052 (Flesher et al.), issued Mar. 19, 1985, and U.S. Pat. No. 4,735,987 (Morita et al.), issued Apr. 5, 1988, all of which are incorporated by reference.

Surface crosslinking of the initially formed polymers is a preferred process for obtaining hydrogel-forming absorbent polymers having relatively high porosity hydrogel-layer ("PHL"), performance under pressure ("PUP") capacity and saline flow conductivity ("SFC") values, which may be beneficial in the context of the present invention. Suitable general methods for carrying out surface crosslinking of hydrogel-forming absorbent polymers according to the present invention are disclosed in U.S. Pat. No. 4,541,871 (Obayashi), issued Sep. 17, 1985; published PCT application WO92/16565 (Stanley), published Oct. 1, 1992, published PCT application WO90/08789 (Tai), published Aug. 9, 1990; published PCT application WO93/05080 (Stanley), published Mar. 18, 1993; U.S. Pat. No. 4,824,901 (Alexander), issued Apr. 25, 1989; U.S. Pat. No. 4,789,861 (Johnson), issued Jan. 17, 1989; U.S. Pat. No. 4,587,308 (Makita), issued May 6, 1986; U.S. Pat. No. 4,734,478 (Tsubakimoto), issued Mar. 29, 1988; U.S. Pat. No. 5,164,459 (Kimura et al.), issued Nov. 17, 1992; published German patent application 4,020,780 (Dahmen), published Aug. 29, 1991; and published European patent application 509,708 (Gartner), published Oct. 21, 1992; all of which are incorporated by reference. See also, U.S. Pat. No. 5,562,646 (Goldman et al.), issued Oct. 8, 1996 and U.S. Pat. No. 5,599,335 (Goldman et al.), issued Feb. 4, 1997, herein incorporated by reference.

For some embodiments of the present invention, it is advantageous if the hydrogel-forming absorbent polymer particles prepared according to the present invention are typically substantially dry. The term "substantially dry" is used herein to mean that the particles have a liquid content, typically water or other solution content, less than about 50%, preferably less than about 20%, more preferably less than about 10%, by weight of the particles. In general, the liquid content of the hydrogel-forming absorbent polymer particles is in the range of from about 0.01% to about 5% by weight of the particles. The individual particles can be dried by any conventional method such as by heating. Alternatively, when the particles are formed using an aqueous reaction mixture, water can be removed from the reaction mixture by azeotropic distillation. The polymer-containing aqueous reaction mixture can also be treated with a dewatering solvent such as methanol. Combinations of these drying procedures can also be used. The dewatered mass of polymer can then be chopped or pulverized to form substantially dry particles of the hydrogel-forming absorbent polymer.

Other Gelling Polymers

Gels based on acrylamide are also suitable for use in the present invention. Specifically suitable are acrylamide, 2-(acryloyloxyl)ethyl acid phosphate, 2-acyrlamido-2-methylpropanesulfonic acid, 2-dimethylaminoethyl acrylate, 2,2'-bis(acrylamido)acetic acid, 3-(methacrylamido)propyltrimethylammonium chloride, acrylamidomethylpropanedimethylammonium chloride, acrylate, acrylonitrile, acrylic acid, diallyldimethylammonium chloride, diallyammonium chloride, dimethylaminoethyl acrylate, dimethylaminoethyl methacrylate, ethylene glycol, dimethacrylate, ethylene glycol monomethacrylate, methacrylamide, methylacrylamidopropyltrimethylammonium chloride, N,N-dimethylacrylamide, N-[2 [[5-(dimethylamino)1-naphthaleny]sulfonyl]amino[ethyl]-2-acrylamide, N-[3-dimehtylamino)propyl]acrylamide hydrochloride, N-[3-(dimethylamino)propyl]methacrylamide hydrochloride, poly(diallyldimethylammonium chloride), sodium 2-(2-carboxybenzoyloxy)ethyl methacrylate, sodium acrylate, sodium allyl acetate, sodium methacrylate, sodium styrene sulfonate, sodium vinylacetate, triallylamine, trimethyl(N-acryloyl-3-aminopropyl)ammonium chloride, triphenylmethane-leuco derivatives, vinyl-terminated polymethylsiloxane, N-(2-ethoxyethyl)acrylamide, N-3-(methoxypropyl)acrylamide, N-(3-ethoxypropyl)acrylamide, N-cyclopropylacrylamide, N-n-propylacrylamide, and N-(tetrahydrofurfuryl)acrylamide.

Also suitable are the gels based on N-isopropylacrylamide. These can include N-isopropylacrylamide, 2-(diethylamino)ethyl methacrylate, 2-(dimethylamino)ethyl methacrylate, 2-acrylamido-2-methyl-1-propanesulfonacrylate, acrylic acid, acrylamide alkyl methacrylate, bis(4-dimethylamino)phenyl)(4-vinylphenyl)methyl leucocyanide, Concanavalin A (Lecithin), hexyl methacrylate, lauryl methacrylate, methacrylic acid, methacrylamidopropyltrimethylammonium chloride, n-butyl methacrylate, poly(tetrafluoroethylene), polytetramethylene ether glycol, sodium acrylate, sodium methacrylate, sodium vinyl sulfonate, and vinyl-terminated polymethylsiloxane.

Also suitable are the gels based on N,N'-diethylacrylamide. These can include N,N'-diethylacrylamide, methyacrylamidopropyltrimethylammonium chloride, N-acryloxysuccinimide ester, N-tert-butylacrylamide, and sodium methacrylate.

Gels based on acrylate are also suitable. These may include 2-dimethylaminoethyl acrylate, 2-acrylamido-2-methylpropanesulfonic acid, acrylamide, triallylamine, acrylate, acrylamide, methyl methacrylate, divinylbenzene, N,N-dimehtylaminoethyl methacrylate, poly(oxytetramethylene dimethacrylate), poly(2-hydroxyethyl methacrylate), poly(2-hydroxypropyl methacrylate), and polyethylene glycol methacrylate.

Also suitable are the gels based on various monomers. These can include acrylic acid, methacrylamidopropyltrimethylammonium chloride, Collagen, dipalmitoylphosphatidylethanolamine, poly[4-6-decadiene-1,10-diolbis(n-butoxycarbonylmethyl urethane)], poly[bis[aminoethoxy)ethoxy]phosphazene], poly[bis[(butoxyethoxy)ethoxy]phosphazene], poly[bis[ethoxyethoxy)ethoxy]phosphazene], poly[bis[methoxyethoxy)ethoxy]phosphazene], poly[bis[methoxyethoxy)phosphazene], polydimethylsiloxane, polyethylene oxide, poly(ethylene-dimethylsiloxane-ethylene oxide), poly(N-acrylopyrrolidine), poly[n,n-dimethyl-N-[(methacryloyloxyethyl]-N-(3-sulfopropyl)ammonium betaine], polymethacrylic acid, polymethacryloyl dipeptide, polyvinyl alcohol, polyvinyl alcohol-vinyl acetate, polyvinyl methyl ether, furan-modified poly(n-acetylethylene imine), and malein imide-modified poly(n-acetylethylene imine).

Also suitable as hydrogels are hydrogels that comprise a monomer selected from the group consisting of: include hydroxyalkyl acrylates, hydroxyalkyl methacrylates, N-substituted acrylamides, N-substituted methacrylamides, N-vinyl-2-pyrrolidone, N-acroylpyrrolidone, acrylics, methacrylics, vinyl acetate, acrylonitrile, styrene, acrylic acid, methacrylic acid, crotonic acid, sodium styrene sulfonate, sodium 2-sulfoxyethyl methacrylate, 2-acrylamido-2-methylpropanesulfonic acid, vinylpyridine, aminoethyl methacrylates, 2-methacryloyloxytrimethylammonium chloride, N,N'-methylenebisacrylamide, poly(ethylene glycol) dimethacrylate, 2,2'-(p-phenylenedioxy diethyl dimethacrylate, divinylbenzene and triallylamine.

Also suitable are the gels disclosed in U.S. Pat. Nos. 4,555,344, 4,828,710, and European Application EP 648, 521 A2 (all of which are herein incorporated by reference).

High Surface Area Materials

In addition to the osmotic absorbent (for example, hydrogel-forming absorbent polymers), the present invention can comprise a high surface area material. It is this high surface area material that provides, either itself or in combination with the hydrogel-forming absorbent polymer, the separation apparatus or vessel with high capillary sorption absorbent capacity. As discussed herein, high surface area materials are described, in one regard, in terms of their capillary sorption absorbent capacity (measured without hydrogel-forming polymer or any other optional material contained in the separation apparatus or vessel). It is recognized that materials having high surface areas may have uptake capacities at very high suction heights (e.g., 100 cm or higher). This allows the high surface area materials to provide one or both of the following functions: i) a capillary pathway of liquid to the osmotic absorbents, and/or ii) additional absorbent capacity. Thus, while the high surface area materials may be described in terms of their surface area per weight or volume, applicants herein alternatively use capillary sorption absorbent capacity to describe the high surface area material because capillary sorption absorbent capacity is a performance parameter that generally will provide the separation apparatus or vessel used in the present invention with the requisite suction capabilities to provide improved absorbent articles. It will be recognized that certain high surface area materials, e.g. glass microfibers, will themselves not exhibit particularly high capillary sorption absorbent capacity at all heights, especially very high heights (e.g., 100 cm and higher). Nonetheless, such materials may provide the desired capillary pathway of liquid to the hydrogel-forming absorbent polymer or other osmotic absorbent to provide the requisite capillary sorption absorbent capacities, even at relatively high heights, when combined with the hydrogel-forming polymer or other osmotic absorbent.

Any material having sufficient capillary sorption absorbent capacity when used in combination with the hydrogel-forming absorbent polymer or other osmotic absorbent will be useful in the separation apparatus or vessel of the present invention. In this regard, the term "high surface area material" refers to any material that itself (i.e., as measured without the osmotic absorbent or any other optional material that is contained in the separation apparatus or vessel) exhibits one or more of the following capillary sorption absorbent capacities: (I) A capillary sorption absorbent capacity of at least about 2 g/g at a suction height of 100 cm, preferably at least about 3 g/g, still more preferably at least about 4 g/g, and still more preferably at least about 6 g/g, at a height of 100 cm; (II) A capillary sorption absorbent capacity at a height of 35 cm of at least about 5 g/g, preferably at least about 8 g/g, more preferably at least about 12 g/g; (III) A capillary sorption absorbent capacity at a height of 50 cm of at least about 4 g/g, preferably at least about 7 g/g, more preferably at least about 9 g/g; (IV) A capillary sorption absorbent capacity at a height of 140 cm of at least about 1 g/g, preferably at least about 2 g/g, more preferably at least about 3 g/g, still more preferably at least about 5 g/g; or (V) A capillary sorption absorbent capacity at a height of 200 cm of at least about 1 g/g, preferably at least about 2 g/g, more preferably at least about 3 g/g, still more preferably at least about 5 g/g.

In one embodiment, the high surface area material will be fibrous (hereafter referred to as "high surface area fibers") in character, so as to provide a fibrous web or fibrous matrix when combined with the hydrogel-forming absorbent polymer or other osmotic absorbent. Alternatively, the high surface area material will be an open-celled, hydrophilic polymeric foam (hereafter referred to as "high surface area polymeric foams" or more generally as "polymeric foams"). These materials are described in detail below.

High surface area fibers useful in the present invention include those that are naturally occurring (modified or unmodified), as well as synthetically made fibers. The high surface area fibers have surface areas much greater than fibers typically used in absorbent articles, such as wood pulp fibers. The high surface area fibers used in the present invention will desirably be hydrophilic. As used herein, the term "hydrophilic" describes fibers, or surfaces of fibers, that are wettable by aqueous liquids (e.g., aqueous body liquids) deposited on these fibers. Hydrophilicity and wettability are typically defined in terms of contact angle and the surface tension of the liquids and solids involved. This is discussed in detail in the American Chemical Society publication entitled Contact Angle, Wettability and Adhesion, edited by Robert F. Gould (Copyright 1964). A fiber, or surface of a fiber, is said to be wetted by a liquid (i.e., hydrophilic) when either the contact angle between the liquid and the fiber, or its surface, is less than 90 degrees, or when the liquid tends to spread spontaneously across the surface of the fiber, both conditions normally co-existing. Conversely, a fiber or surface is considered to be hydrophobic if the contact angle is greater than 90 degrees and the liquid does not spread spontaneously across the surface of the fiber. The hydrophilic character of the fibers useful herein may be inherent in the fibers, or the fibers may be naturally hydrophobic fibers that are treated to render them hydrophilic. Materials and methods for providing hydrophilic character to naturally hydrophobic fibers are well known.

High surface area fibers useful herein will have capillary suction specific surface areas in the same range as the polymeric foams described below. Typically, however, high surface area fibers are characterized in terms of BET surface area.

High surface area fibers useful herein include glass microfibers such as, for example, glass wool available from Evanite Fiber Corp. (Corvallis, Oreg.). Glass microfibers useful herein will typically have fiber diameters of not more than about 0.8 µm, more typically from about 0.1 µm to about 0.7 µm. These microfibers will have surface areas of at least about 2 $m^2/g$, preferably at least about 3 $m^2/g$. Typically, the surface area of glass microfibers will be from about 2 $m^2/g$ to about 15 $m^2/g$. Representative glass microfibers for use herein are those available from Evanite Fiber Corp. as type 104 glass fibers, which have a nominal fiber diameter of about 0.5 µm. These glass microfibers have a calculated surface area of about 3.1 $m^2/g$.

Another type of high surface area fibers useful herein are fibrillated cellulose acetate fibers. These fibers (referred to herein as "fibrets") have high surface areas relative to cellulose-derived fibers commonly employed in the absorbent article art. Such fibrets have regions of very small diameters, such that their particle size width is typically from about 0.5 to about 5 µm. These fibrets typically have a surface area of about 20 $m^2/g$. Representative fibrets useful as the high surface area materials herein are available from Hoechst Celanese Corp. (Charlotte, N.C.) as cellulose acetate Fibrets®. For a detailed discussion of fibrets, including their physical properties and methods for their preparation, see "Cellulose Acetate Fibrets: A Fibrillated Pulp With High Surface Area", Smith, J. E., Tappi Journal, December 1988, p. 237; and U.S. Pat. No. 5,486,410 (Groeger et al.) issued Jan. 23, 1996; the disclosure of each of which is incorporated by reference herein.

In addition to these fibers, the skilled artisan will recognize that other fibers well known in the absorbency art may be modified to provide high surface area fibers for use herein. Representative fibers that may be modified to achieve high surface areas required by the present invention are disclosed in U.S. Pat. No. 5,599,335, supra (see especially columns 21-24), incorporated herein by reference.

Regardless of the nature of the high surface area fibers utilized, the fibers and the osmotic absorbent will be discrete materials prior to combination. As used herein, the term "discrete" means that the high surface area fibers and the osmotic absorbents are each formed prior to being combined to form the core of the separation apparatus or vessel. In other words, the high surface area fibers are not formed subsequent to mixing with the osmotic absorbent (e.g., hydrogel-forming absorbent polymer), nor is the osmotic absorbent formed after combination with the high surface area fibers. Combining of the discrete respective components ensures that the high surface area fibers will have the desired morphology and, more importantly, the desired surface area.

Spacers

Spacer materials may be used in the absorbent materials of the present invention. Spacer materials suitable for use in the present invention include any fibrous or particulate material that is, at most, only slightly soluble in water and/or lipophilic fluid. The spacer can be dispersed throughout a matrix of absorbent material in order to improve its permeability above that of a matrix made up of an absorbent material alone; or, the spacer can be used to maintain permeability even after the absorbent material swells and/or gels upon exposure to water. Therefore, the spacer helps reduce the pressure drop across an absorbent material matrix when a water-bearing fluid is passed through the matrix. In addition, if the absorbent material is prone to congealing after exposure to water and subsequent collapse, the spacer can aid in the reduction or prevention of gel congealing upon collapse.

Non-limiting examples of suitable spacer materials include sand, silica, aluminosilicates, glass microspheres, clay, layered silicates, wood, natural textile materials, synthetic textile materials, alumina, aluminum oxide, aluminum silicate, zinc oxide, molecular sieves, zeolites, activated carbon, diatomaceous earth, hydrated silica, mica, microcrystalline cellulose, montmorillonite, peach pit powder, pecan shell powder, talc, tin oxide, titanium dioxide, walnut shell powder, and particles of different metals or metal alloys. Also useful are particles made from mixed polymers (e.g., copolymers, terpolymers, etc.), such as polyethylene/polypropylene copolymer, polyethylene/propylene/isobutylene copolymer, polyethylene/styrene copolymer, and the like.

Other particulate materials useful herein are the synthetic polymeric particles selected from the group consisting of polybutylene, polyethylene, polyisobutylene, polymethylstyrene, polypropylene, polystyrene, polyurethane, nylon, teflon, and mixtures thereof. Of these, the most preferred are polyethylene and polypropylene particles, with the oxidized versions of these materials being especially preferred. Examples of commercially available particles useful herein include the ACumist™ micronized polyethylene waxes available from Allied Signal (Morristown, N.J.) available as the A, B, C, and D series in a variety of average particle sizes ranging from 5 microns to 60 microns. Preferred are the ACumist™ A-25, A-30, and A-45 oxidized polyethylene particles having a means particle size of 25, 30, and 45 microns, respectively. Examples of commercially available polypropylene particles include the Propyltex series available from Micro Powders (Dartek) and ACuscrub™ 51, available from Allied Signal (Morristown, N.J.) having a mean particle size of about 125 microns.

Absorbent Matrix

In order to increase the "dry" absorbent matrix permeability or maintain the permeability of the absorbent matrix when it is wet, it is important to provide a sufficient absorbent material to spacer, and, optionally, high surface area material ratio. Since the weight of possible spacers can vary greatly with respect to the weight of the absorbent material, the proportion must be quantified on a "dry" volumetric basis. "Net matrix volume" is the volume of the absorbent materials, spacers, and, optionally, any high surface area materials not including any inter-material volume the materials themselves may contain or any volume attributable to intra-material void spaces. "Intra-material void volume" is the cumulative volume of voids between material particles and/or fibers that typically and naturally occurs when particles and/or fibers occupy a given space. "Dry bulk matrix volume" is equal to the net matrix volume combined with the intra-material void volume on a dry basis. With respect to the present invention, it is preferred that the absorbent material is from 50 to 100%, more preferably from 75 to 95%, of the dry bulk matrix volume. It is preferred that the spacer is from 1 to 50%, more preferably from 5 to 25%, of the dry bulk matrix volume. It is preferred that the optional high surface area material be from 1 to 50%, more preferably from 5 to 25%, of the dry bulk matrix volume.

The gel materials, spacers, and, optionally, the high surface area materials can be formed into fibrous structures, woven or non-woven, such as sheets or films or membranes and configured in different ways. The sheet configuration is application-dependent and generally includes four generic configurations, namely, tubes, hollow fibers, plate and frame units, and spiral wound modules, all of which are within the scope of the present invention.

The loading density of water absorbing agent on such fibrous structures of the present invention may be in the range of from about 50 g of agent/m2 of fibrous structure to about 2000 g of agent/m2 of fibrous structure.

Tubes are, perhaps, the simplest configuration, in which the sheet is cast on the inside wall of a porous support tube. The tube configuration, however, can be cost-prohibitive with the porous support tube itself being the dominant cost factor.

Hollow fibers are, in theory, the ideal sheet configuration in that there is no "parasite" drag and no expensive porous support tube. Such fibers can be pressurized on the inside permitting "thin channel" fluid management of the water-bearing fluid. However, the biggest disadvantage of hollow fibers is the pressure constraint, which limits the cross-flow velocity down the lumen of the fiber. In addition, the hollow fiber configuration is more susceptible to fouling and plugging than the other three configurations; however, larger diameter fibers are becoming popular to improve fouling resistance. Fortunately, hollow fibers can be readily cleaned by back washing, which tends to compensate for their propensity to foul. In contrast, it is not recommended that tubes; plate and frame units; and spiral wound modules be back-washed, due to problems with membrane delamination and glue line seal rupture.

Flat sheets in a plate and frame unit offer the greatest versatility; they are also the most cost-prohibitive.

While spiral wound modules were originally developed for reverse osmosis; they are capturing an increased share of the ultrafiltration market by providing one of the least expensive ultrafiltration modules available in terms of cost per sheet area unit. Spiral wound units cannot be unwrapped for cleaning and most cannot be autoclaved. In terms of propensity to fouling, they are between hollow fibers and tubes (as well as the pricier plate and frame units).

The gel material can also be directly deposited onto a fibrous structure or a spacer material. This can be achieved by first applying the aqueous solution of a monomer containing from 10 to 100% of a water-soluble unsaturated monomer onto a fibrous structure or a spacer material and then polymerizing said monomer.

The thickness of the fibrous structure is generally in the range of from 0.01 to 10 mm, preferably 0.1 to 5 mm. The non-woven fabric is desired to have a basis weight in the range of from 5 to 1000 g/sq. m, preferably from 10 to 300 g/sq. m.

Processes of the Invention

The present invention is directed to a process for removing water from a lipophilic fluid and water emulsion. The process includes exposing the emulsion to an absorbent material, as discussed in detail above, in order to effect the removal of the water from the lipophilic fluid and water emulsion. The lipophilic fluid is recovered and termed "lipophilic fluid." Within this process, it is possible to add the optional initial steps of exposing a fabric to lipophilic fluid and water and then recovering the lipophilic fluid and water in the form of the lipophilic fluid and water emulsion.

Although not required, it is also possible to pass the lipophilic fluid and water emulsion through a particulate matter filter such that particles and particle aggregates about 1 micron or larger are removed, preferably such that particles and particle aggregates about 5 microns or larger are removed, more preferably such that particles and particle aggregates about 10 microns or larger are removed, even more preferably such that particles and particle aggregates about 15 microns or larger are removed, even more preferably such that particles and particle aggregates about 25 microns or larger are removed. It is further possible to add to the process the step of exposing the lipophilic fluid and water emulsion to activated carbon prior to exposure to the absorbent material.

As previously discussed, the absorbent material may comprise surface cross-linked polymers, surface cross-linked polyacrylates, surface cross-linked polyacrylamides, or combinations of these absorbent materials. Further, any of the absorbent materials may have a fibrous morphology, a particulate morphology, or mixtures of any of the absorbent materials with similar or different morphologies. The absorbent material may take several forms, including but not limited to, a porous woven sheet impregnated with absorbent materials, a film, or a membrane.

In order to aid the absorption of water from and/or separation of the lipophilic fluid and water emulsion, it may be desirable to increase the temperature of the emulsion prior to exposing the emulsion to the absorbent material. If the emulsion is preheated, it is preferable to heat it by at least about 10° C. Preferably however, the temperature of the lipophilic fluid and water emulsion is at most about 50° C. prior to exposing the emulsion to absorbent material since some absorbent materials cannot absorb water at higher temperatures, particularly when temperature increase is one of their trigger or collapse mechanisms. Aside from heating the emulsion in order to aid the absorption of water from and/or separation of the lipophilic fluid and water emulsion, it may be additionally or alternatively desirable to cool the emulsion, and/or add demulsifying agents to the emulsion in order to aid the absorption of water from and/or separation of the lipophilic fluid and water emulsion.

Once the absorbent material has absorbed at least a portion of the water removed from the lipophilic fluid and water emulsion, it is desirable to trigger the absorbent material to release the removed water by exposing the absorbent material to a trigger mechanism including, but not limited to, light, pH, temperature, sound, electric field, pressure, ionic strength, vibration, and combinations of these trigger mechanisms. Absorbent material "trigger" or "collapse" mechanisms and methods for their introduction are well known in the absorbent material arts.

Once the emulsion is separated, the collected lipophilic fluid can be exposed to activated carbon in order to further facilitate its purification and recycling into the system. Further, the removed water may also be exposed to activated carbon prior to its disposal or recycling into the system. Methods to purify the collected or separated lipophilic fluid include well-known distillation processes, membrane filters, adsorption processes, absorption processes, extraction processes, ion exchange processes, air stripping processes, and chromatography.

The lipophilic fluid and water emulsion may also contain up to about 10% emulsifier by weight of the emulsion. If it does contain emulsifier, it is preferable for the lipophilic fluid and water emulsion to have a water/lipophilic fluid/emulsifier ratio of from about 1/98.9/0.1 to about 40/55/5 by weight of the emulsion. Further, as discussed in the "Adjunct Ingredients" section above, it is preferred that the emulsifier also contains a surfactant. Lastly, also as discussed in the aforementioned section, the lipophilic fluid and water emulsion may also contain adjunct ingredients selected from the group consisting of enzymes, bleaches, surfactants, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents, and mixtures of these adjuncts.

In the present invention, it is preferred that the lipophilic fluid includes a linear siloxane, a cyclic siloxane, and mixtures of these siloxanes. It is more preferable that these siloxanes are selected from the group consisting of octamethylcyclotetrasiloxane, decamethylcyclopentasiloxane, dodecamethylcyclohexasiloxane, and mixtures of these siloxanes. It is even more preferred if the lipophilic fluid contains decamethylcyclopentasiloxane. Lastly, it is most preferred if the lipophilic fluid contains decamethylcyclopentasiloxane and is substantially free of octamethylcyclotetrasiloxane.

It was also surprisingly found that absorbent materials such as gels can effectively remove surfactants from the lipophilic fluid and water emulsion. The surfactant that are removed may include the following nonlimiting examples:
a) Anionic surfactants (e.g., alkyl or aryl sulfates, aerosol derivatives, etc)
b) Cationic or basic surfactants (e.g., quaternary surfactants, primary and secondary amines, etc.)
Or combinations of above.

Systems of the Invention

The present invention also includes a system for removing water from a lipophilic fluid and water emulsion. In addition to the following disclosure, the system can be capable of performing the previously described method including non-essential and preferred methods/limitations/modes of operation. Mainly, the system is capable of exposing an emulsion of a lipophilic fluid and water and/or surfactant to an absorbent material in order to effect the removal of water and/or surfactant from the emulsion wherein at least the lipophilic fluid is recovered from the absorbent material as pure or substantially pure lipophilic fluid. As in the method, the system may be additionally capable of initially exposing a fabric to a lipophilic fluid and water and/or surfactants and recovering the lipophilic fluid and water and/or surfactants in the form of an emulsion of a lipophilic fluid and water and/or surfactants. The system may additionally be capable of passing the emulsion of a lipophilic fluid and water and/or surfactants through a particulate matter filter such that particles and particle aggregates about 1 micron or larger are removed. As with the previously described method, the absorbent material may take the form of a porous woven sheet impregnated with absorbent polymers.

The methods and systems of the present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the process of the present invention in addition to related processes.

The methods of the present invention may also be performed in an apparatus, which is not a modified existing apparatus but is one specifically built in such a manner so as to conduct the present invention or may be added to another apparatus as part of a lipophilic fluid processing system. This would include all the associated plumbing, such as connection to a chemical and water supply, and sewerage for waste wash fluids.

The systems of the present invention may be used in an apparatus, which is not a modified existing apparatus but is one specifically built in such a manner so as to conduct the present invention and related processes.

The methods of the present invention may also be performed in an apparatus capable of "dual mode" functions. A "dual mode" apparatus is one capable of both washing and drying fabrics within the same drum. These apparati are commercially available, particularly in Europe.

An apparatus used to carry out the present invention will typically contain some type of control system. These include electrical systems, such as, the so-called smart control systems, as well as more traditional electromechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the system of the present invention is only a part of a cleaning system, the so called "smart system" could be communicating with the other cleaning devices which would be used to complete the remainder of the cleaning process, such as a washing machine, and a dryer.

The emulsion de-watering filter 70 (see FIG. 1) contains a outer cylinder 30 sealed from both ends by discs 27 and 28. The disc 27 has an inlet opening 25 that accesses the inside of the outer cylinder 30. The disc 28 has an opening 26 that establishes communication with perforated inner cylinder 35. Emulsion de-watering media 40 forms a barrier between the inside of outer cylinder 30 and inner cylinder 35. The emulsion de-watering media 40 consists of a fiber material used to support superabsorbent polymer particles. Gel particles are uniformly distributed through the fiber material.

The further process steps may include:
a) Pumping lipophilic fluid emulsion thru the inlet 27 inside the outer cylinder 30 and contacting lipophilic fluid emulsion with emulsion de-watering media 40.
b) Removing de-watered lipophilic fluid with reduced surfactant content thru perforations of inner tube 35 and outlet 28.

In the new development, fiber material is used to provide a support structure for polymer particles and provide sufficient void space between polymer particles. The void space allows particles to swell upon exposure to water without restricting the flow of the emulsion.

The emulsion of the lipophilic fluid and water may pass through the water absorbing agent housed within the housing of the filter from the inlet to the outlet at a flow rate of from about 10 ml/min to about 1000 ml/min.

In one embodiment, the filter comprises a filter housing, an inlet port, an outlet port, and a water absorbing agent housed within the housing; the distribution of the water absorbing agent within the housing is greater nearer the outlet port than the inlet port.

It was also discovered that contacting a lipophilic fluid emulsion containing surfactants with ionic gels resulted in increase of dry weight of gels. The increase in dry weight of gels corresponded to a significant amount of surfactants being absorbed into the ionic gel structure. Moreover, even though significant amounts of surfactant are absorbed into the gel, the gel water absorbing capacity remains the same. Therefore, an additional benefit of gels to remove surfactants is utilized without reducing the gel water absorbing performance.

What is claimed is:

1. A filter system for removing water from a lipophilic fluid comprising:
   a. a filter housing;
   b. an inlet port in the housing for receiving a lipophilic fluid and water emulsion comprising a lipophilic fluid and water, and optionally, a surfactant;
   c. an outlet port in the housing for releasing a pure or substantially pure lipophilic fluid;
   d. a quantity of water absorbing agent having a water absorbing capacity of at least about 50 g of water/g of water absorbing agent, the water absorbing agent is housed within the housing; and
   e. a source of the lipophilic fluid and water emulsion in fluid communication with the water absorbing agent through the inlet port;
wherein the lipophilic fluid is selected from the group consisting of linear or cyclic siloxanes, perflourinated amines, C6 or higher diols, polyol esters, and mixtures thereof; and distribution of the water absorbing agent within the housing is greater nearer the outlet port than the inlet port.

2. The filter system according to claim 1 wherein the water absorbing agent has an average particle size of from about 5 microns to about 500 microns.

3. The filter system according to claim 1 wherein the water absorbing agent is selected from the group consisting of hydrogel agents, actylate-containing agents, acrylamide-containing agents, cellulose-containing agents and mixtures thereof.

4. The filter system according to claim 1 wherein the water absorbing agent comprises two or more agents each separate and discrete from the other agents.

5. The filter system according to claim 1 wherein the water absorbing agent comprises two or more agents commingled.

6. The filter system according to claim 1 wherein the filter system comprises a fibrous structure.

7. The filter system according to claim 6 wherein the fibrous structure is in the form of a sheet.

8. The filter system according to claim 6 wherein the water absorbing agent is loaded onto the fibrous structure and loading density of water absorbing agent is in the range of from about 50 to about 2000 g of agent/$m^2$ of fibrous structure.

9. The filter system according to claim 6 wherein the fibrous structure is a non-woven fibrous structure.

10. The filter system according to claim 1 wherein the filter system has a flow rate of from about 10 ml/mm to about 1000 ml/min.

11. The filter system according to claim 1 wherein water is removed from the lipophilic fluid and water emulsion to a level of less than 5 ppm of water in the pure or substantially pure lipophilic fluid.

12. The filter system according to claim 1 wherein the absorbing agent further comprises a surfactant-removing agent.

13. A process for removing water and/or surfactant from a lipophilic fluid comprising contacting the filter system according to claim 12 with the lipophilic fluid and water emulsion such that water and optionally also surfactant are removed from the lipophilic fluid.

* * * * *

UNITED STATES PATENT AND TRADEMARK OFFICE
CERTIFICATE OF CORRECTION

PATENT NO. : 7,258,797 B2
APPLICATION NO. : 10/238009
DATED : August 21, 2007
INVENTOR(S) : Dewey Edward Burton et al.

It is certified that error appears in the above-identified patent and that said Letters Patent is hereby corrected as shown below:

Column 11

Line 61, delete "methaerylates" and insert -- methacrylates --.

Column 26

Line 7, delete "perflourinated" and insert -- perfluorinated --.

Line 3 of Claim 3, delete "actylate-containing" and insert -- acrylate-containing --.

Line 2 of Claim 10, delete "10 ml/mm" and insert --10 ml/min --.

Signed and Sealed this

Fourth Day of March, 2008

JON W. DUDAS
*Director of the United States Patent and Trademark Office*